(12) United States Patent
Rozman

(10) Patent No.: US 7,099,165 B1
(45) Date of Patent: Aug. 29, 2006

(54) NETWORK HARMONIC SCRUBBER

(75) Inventor: Gregory I. Rozman, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 11/104,021

(22) Filed: Apr. 12, 2005

(51) Int. Cl.
*H02M 1/12* (2006.01)

(52) U.S. Cl. .......................................... 363/39; 363/41

(58) Field of Classification Search ................. 363/39, 363/41, 44, 45, 46, 125; 323/207; 307/105
See application file for complete search history.

(56) References Cited

U.S. PATENT DOCUMENTS 5,218,520 A    6/1993  Rozman et al.
5,648,894 A *  7/1997  DeDoncker et al. ......... 363/39
5,731,965 A *  3/1998  Cheng et al. ................. 363/41
6,075,350 A *  6/2000  Peng .......................... 323/207
6,850,426 B1 * 2/2005  Kojori et al. ............... 363/123
6,977,827 B1 * 12/2005 Gritter ........................ 363/40

* cited by examiner

*Primary Examiner*—Adolf Berhane
(74) *Attorney, Agent, or Firm*—Stephen G. Mican

(57) ABSTRACT

An active filtration or harmonic scrubber system for power systems that convert AC power on an AC bus to DC power that cancels or reduces harmonic current injected by nonlinear loads onto the AC bus using high-bandwidth pulse width modulation (PWM) inverters.

18 Claims, 6 Drawing Sheets

Single Line Diagram of NHS

NHS Control Diagram

3-Phase Harmonic Compensator

NETWORK HARMONIC SCRUBBER

FIELD OF THE INVENTION

The invention relates to electrical power conversion equipment that converts alternating current (AC) power on an AC bus to direct current (DC) power, and more particularly to electrical power conditioning equipment that reduces harmonic ripple currents on the AC bus due to nonlinear loads on the AC bus.

BACKGROUND OF THE INVENTION

Proliferation of nonlinear loads attached to AC power supply systems has been increasing in recent years. Such a nonlinear load is exemplified by a motor controller (MC) for motor driven loads as commonly used in the aerospace industry. Most of this equipment uses a six-pulse rectifier front-end to convert alternating current (AC) power produced by a generator to direct current (DC) power. Such nonlinear loads cause the rectifiers to inject harmonic current due to their nonlinear behaviour. This extraneous harmonic current can cause problems, such as harmonic resonances, increased losses and overheating of the electromagnetic components on the bus, such as transformers and motors.

A MC is used in conjunction with an AC dynamoelectric machine to provide variable and controllable speed for a multiplicity of applications. It converts a DC power source to polyphase AC of suitable power and frequency to drive the AC dynamoelectric machine for such applications.

In aircraft, a MC has uses for both low power and high power applications. One high power application is main engine starting, which may be accomplished with a MC and a dynamoelectric machine that functions as a starter motor and a main electrical power generator. Another such aeronautical high power application is the use of a MC for an electric motor driven hydraulic pump (HP). In aircraft, it is common practice to use the main engine starting MC to serve another function after the engine is started, such as controlling other motor driven loads, also requiring high power ratings.

MCs with a six-pulse rectifier front end tend to generate significant harmonics of their operating frequencies, which may be on the order of 1000 Hz or more in aeronautical applications. The most significant harmonics tend to be the $5^{th}$, $7^{th}$ and $11^{th}$. These reflect back from the MC into the AC bus and may adversely affect the operation of other equipment.

Use of tuned passive inductive-capacitive (LC) filters to control extraneous harmonic currents is limited in variable frequency applications commonly used in the aerospace industry. In addition, the presence of LC filters on the AC bus may form series and parallel resonances with the loads, resulting in amplification of harmonic currents. Use of 12-pulse and 18-pulse rectifier front-ends, as well as active front-ends, may be used to alleviate such harmonic currents, but they generally increase weight, size, and cost of the motor drive.

SUMMARY OF THE INVENTION

The invention comprises an active filtration or harmonic scrubber system for power systems that convert AC power on an AC bus to DC power that cancels or reduces harmonic current injected by nonlinear loads onto the AC bus using high-bandwidth pulse width modulation (PWM) inverters.

For a power conversion system that converts alternating current (AC) power on an AC bus to DC power, a preferred embodiment of the invention comprises a harmonic scrubber that reduces ripple currents for selected harmonics on the AC bus due to nonlinear loads on the AC bus, comprising: at least one phase-locked loop (PLL) for producing synchronisation signals for each of the selected harmonics; synchronous filters for each of the selected harmonics for combining corresponding harmonic synchronisation signals with ripple signals that represent the potentials of the ripple currents to produce harmonic compensation control signals for each of the selected harmonics that are equal in amplitude and opposite in phase to the potentials of the ripple currents; at least one pulse width modulator (PWM) for generating PWM drive signals in response to the harmonic compensation control signals; and at least one active filter responsive to the PWM drive signals to reduce the harmonic ripple currents.

DETAILED DESCRIPTION OF THE INVENTION

U.S. Pat. No. 5,218,520 to Rozman et al., owned by the assignee of this application, describes a harmonic compensator that cancels load or generator produced AC ripple on a DC bus. The present invention is adaptation of the Rozman et al. control strategy and power topology to cancellation of AC harmonic content on the AC bus itself.

Figure 1:
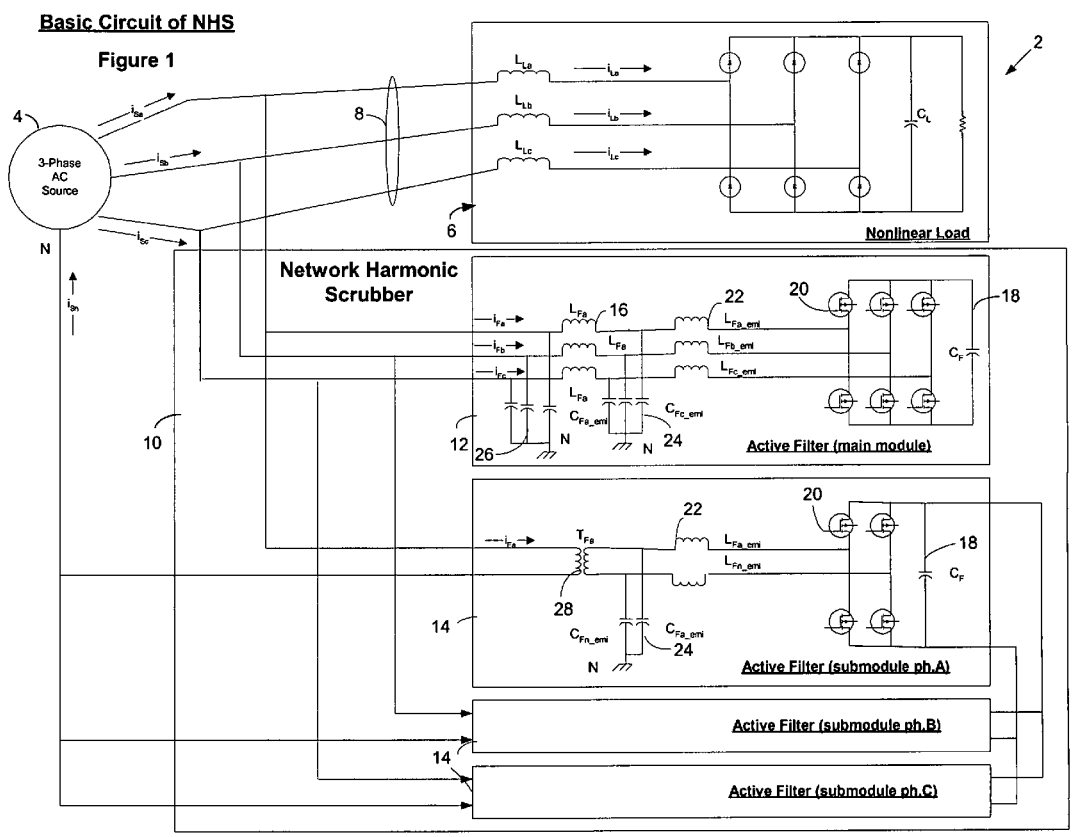
FIG. 1 shows the power topology of a power generation system that incorporates a network harmonic scrubber according to the invention.

FIG. 1 shows the power topology of a power generation system 2 incorporating the invention that comprises a polyphase AC generator 4, a non-linear load 6 coupled to the generator 4 through an AC bus 8 and a network harmonic scrubber (NHS) 10 coupled to the generator 2 and AC bus 68 for removing harmonic current content from the AC bus 8. It contains a main compensating polyphase module 12 and a transformer-isolated single-phase sub-module 14 for each phase.

This topology allows a cost/performance optimisation by allowing the main compensating module 12 to comprise a higher power rating, but lower switching frequency insulated gate bipolar transistor (IGBT) module and the sub-modules 14 to each be a lower power rating, but higher switching frequency metal oxide semiconductor field effect transistor (MOSFET) modules. The main module 12 provides compensation up to a ripple frequency of approximately 6 kHz, whilst the sub-modules 14 compensate up to a ripple frequency of approximately 20 kHz. Harmonics above approximately 20 kHz are suppressed by a passive filtration as described below. During unbalanced conditions, the sub-modules 14 provide a lower frequency compensation to support the main module 12.

The main module 12 comprises filter inductors 16 coupled between each phase of the polyphase AC generator 4 and a charging capacitor 18 by way of switching transistors 20. The switching transistors 20 for the main module 12 are preferably of the IGBT type for high power handling capability. The operation of the main module 12 is similar to that for the power converter 20 described in Rozman et al., except that the switching transistors 20 connect the inductors 16 and charging capacitor 18 to alternate phases of the polyphase generator 4 instead of across a DC bus.

Electro-magnetic interference (EMI) due to switching is attenuated by passive L-C filtration provided by EMI inductors 22 and EMI capacitors 24 between the switching transistors and the inductors 16 on each phase. Input capacitors 26 on each phase connected to the inductors 16 passively filter harmonics due to unbalanced loads above approximately 20 kHz.

The input filter of each sub-module 14 is similar to the main module with the difference that a transformer 28 replaces the inductor 16 and there is no input capacitor 26. As explained above, the input capacitors 26 on each phase in the main module 12 provide passive filtering of the harmonics above 20 kHz. It is also possible to use the input capacitors 26 to control harmonics below 20 kHz and greater than 10 kHz in combination with the lower operating frequencies of the sub-modules 14 or with alternative power topologies.

Figure 2:
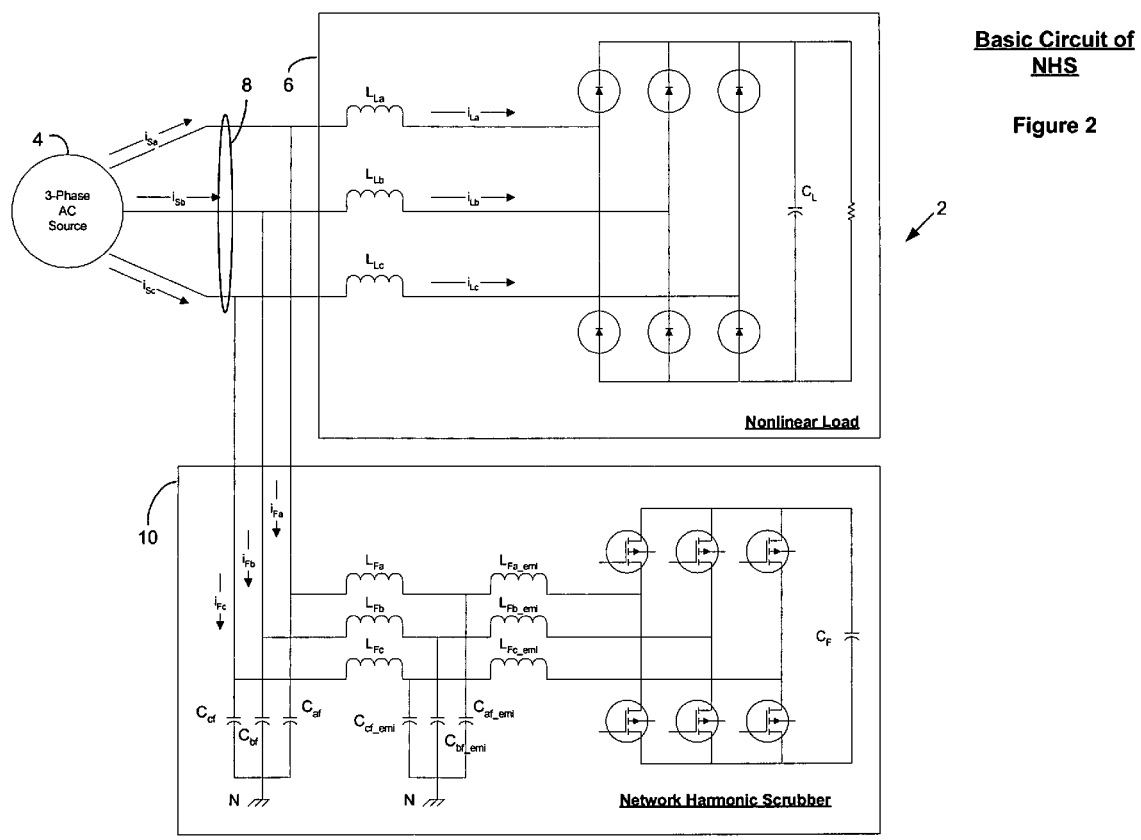
FIG. 2 shows a first alternate power topology for a power generation system that incorporates a network harmonic scrubber according to the invention.

FIG. 2 shows an example of such an alternative power topology. In this case, the NHS 10 comprises a polyphase active filter module 12 alone, with the input capacitors 26 sized to passively filter harmonics above 10 kHz so that the sub-modules 14 are not required.

Figure 3:
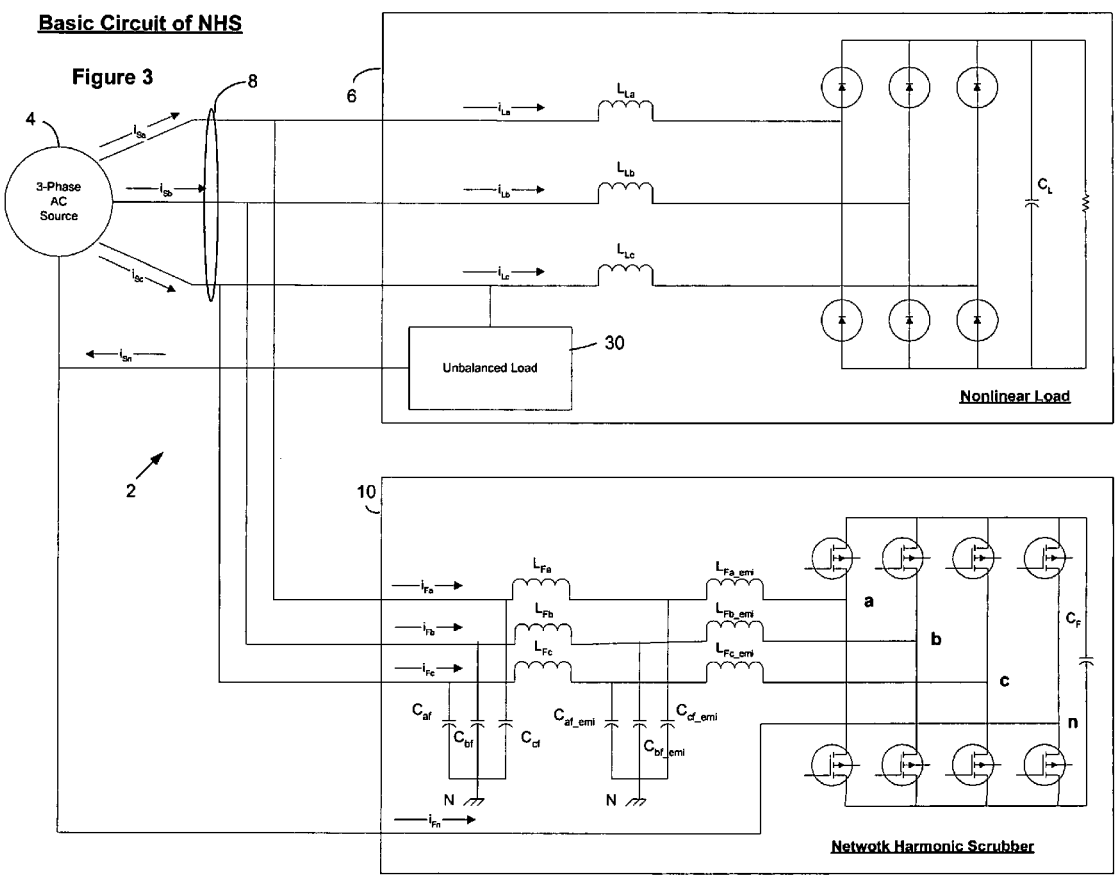
FIG. 3 shows a second alternate power topology for a power generation system that incorporates a network harmonic scrubber according to the invention.

FIG. 3 shows another example of an alternative power topology. In this case, the non-linear load 6 has an unbalanced load 30 between one of the phases and neutral as well. The NHS 10 has additional switching transistors 20 for neutral that connect the inductors 16 and charging capacitor 18 to alternate phases of the polyphase generator 4 and neutral to create potential that cancels out harmonic ripple when the states of the switching transistors 20 are properly sequenced.

Figure 4:
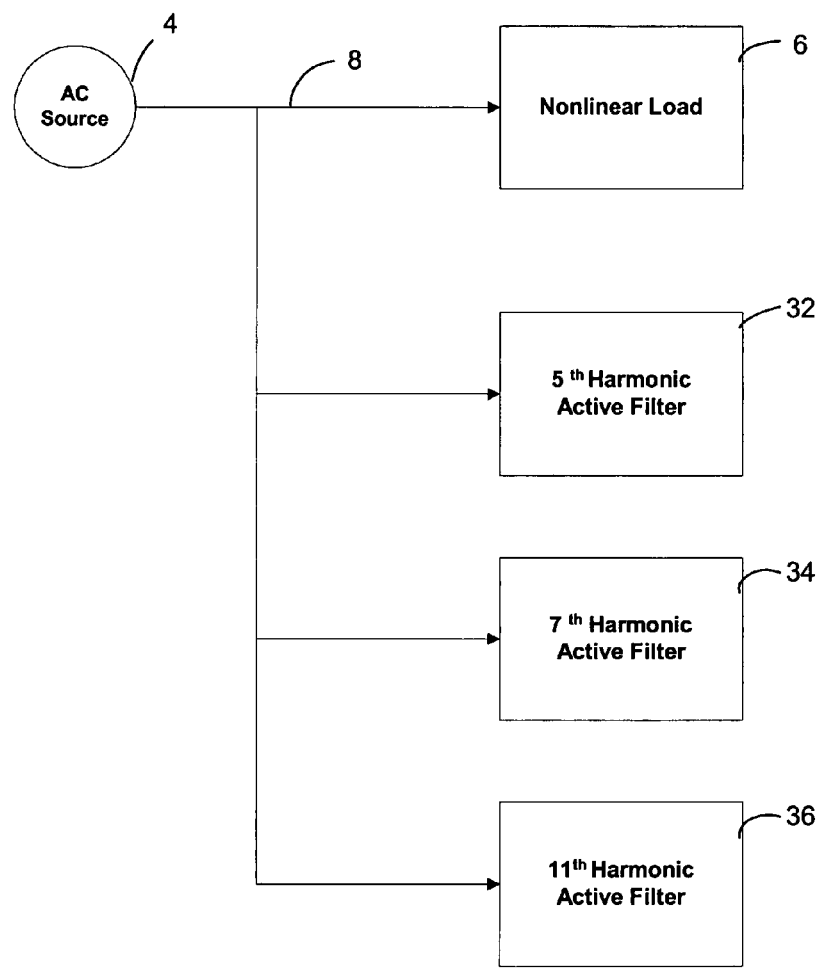
FIG. 4 shows a simple block diagram of a control function for the network harmonic scrubber according to the invention.

Of course, the switching of the switching transistors in the NHS 10 described for any of the topologies described above in FIGS. 1 through 3 must be controlled to sequence them to suppress harmonics of interest. FIG. 4 shows a simple block diagram of this control function is shown in FIG. 4. In FIG. 4, the NHS 10 is represented by a plurality of active harmonic filters, in this case, by $5^{th}$ harmonic active filter 32, $7^{th}$ harmonic filter 34 and $11^{th}$ harmonic filter 36. The control of the NHS 10 is similar to that described in Rozman et al. to achieve this operation.

Figure 5:
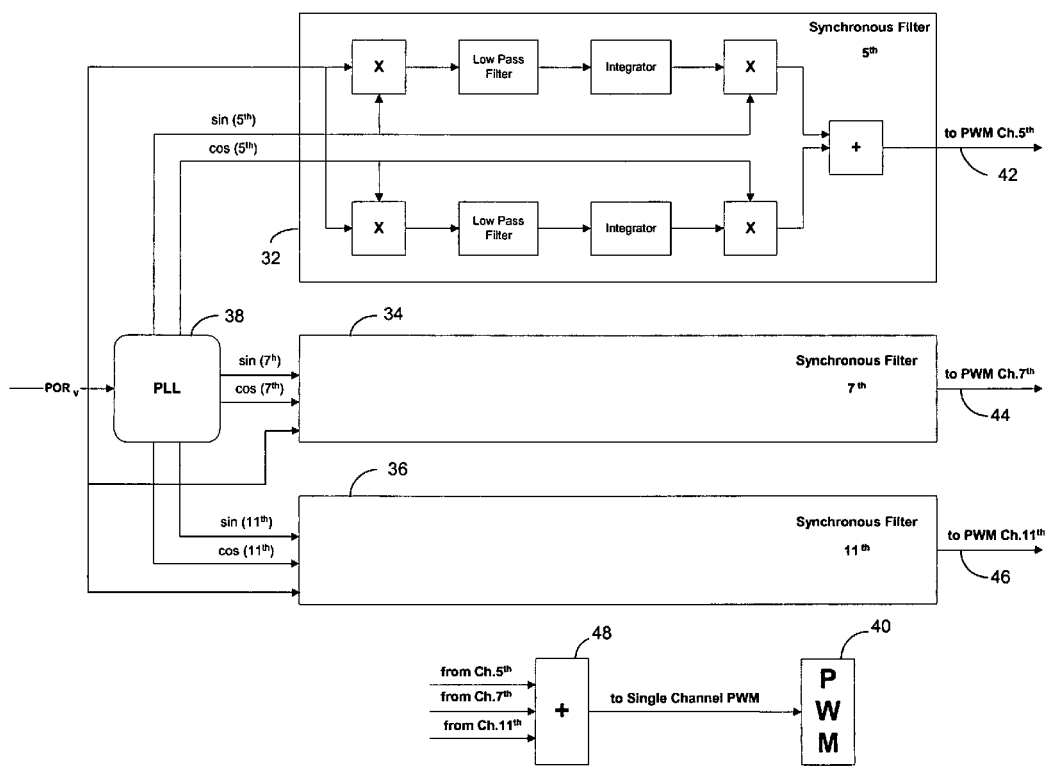
FIG. 5 shows an implementation of the harmonic compensation control for each single-phase sub-module in the network harmonic scrubber according to the invention.

FIG. 5 shows an implementation of this harmonic compensation control for each single-phase sub-module 14 using a phase lock loop (PLL) 38 and a phase width modulator (PWM) 40 for each phase of the AC bus 8 to attenuate the most significant harmonics, the $5^{th}$, $7^{th}$ and $11^{th}$, although other or additional harmonics can be attenuated in a similar fashion. The PLL 38 for each phase uses the potential on its corresponding phase on the AC bus 8 to generate quadrature signals of the $5^{th}$, $7^{th}$ and $11^{th}$ harmonics to be cancelled. The $5^{th}$ harmonic active filter 32 combines a ripple signal that represents the potential of the ripple on the AC bus 8 with the quadrature signal of the $5^{th}$ harmonic from the PLL 38 to produce a $5^{th}$ harmonic control signal on an output line 42 that is equal in amplitude but opposite in phase to the $5^{th}$ harmonic to be cancelled. Likewise, the $7^{th}$ harmonic active filter 34 combines the ripple signal that represents the potential of the ripple on the AC bus 8 with the quadrature signal of the $7^{th}$ harmonic from the PLL 38 to produce a $7^{th}$ harmonic control signal on an output line 44 that is equal in amplitude but opposite in phase to the $7^{th}$ harmonic to be cancelled. Finally, the $11^{h}$ harmonic active filter 36 combines the ripple signal that represents the potential of the ripple on the AC bus 8 with the quadrature signal of the $11^{th}$ harmonic from the PLL 38 to produce an $11^{th}$ harmonic control signal on an output line 46 that is equal in amplitude but opposite in phase to the $11^{th}$ harmonic to be cancelled.

The $5^{th}$, $7^{th}$ and $11^{th}$ harmonic control signals on the lines 42, 44 and 46 are combined in a summer 48 to produce a summed control signal that drives the PWM 40 for the corresponding phase. Each PWM 40 generates a PWM drive signal that controls the switching transistors 20 for its corresponding sub-module 14 for one of the phases in the NWS 10 as described above in connection with FIG. 1 to attenuate the controlled harmonics, in this case, the $5^{th}$, $7^{th}$ and $11^{th}$.

Figure 6:
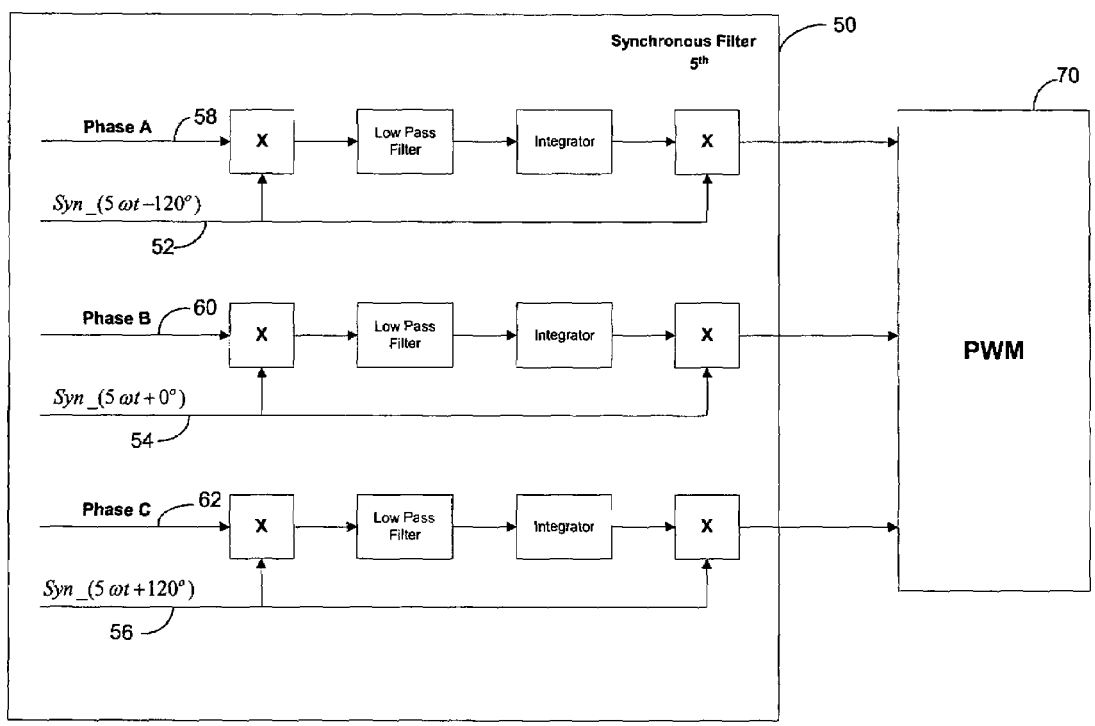
FIG. 6 shows an implementation of the harmonic compensation control for the polyphase main module in the network harmonic scrubber according to the invention.

FIG. 6 shows an implementation of the harmonic compensation control for the polyphase main module 12. A polyphase, in this case, three-phase $5^{th}$ harmonic synchronous filter 50 used with the three-phase main module 12. It is similar to the implementation of the single-phase $5^{th}$ harmonic synchronous filter 32 described above, but the synchronisation signals for the $5^{th}$ harmonic of each phase are generated by the PLL 38 on lines 52, 54 and 56 and ripple signals representing the potentials of ripple on each phase on lines 58, 60 and 62 are combined with the corresponding synchronisation signals to produce harmonic control signals that are equal in amplitude and opposite in phase to the corresponding harmonics to be cancelled on each phase on lines on lines 64, 66 and 68, respectively.

Since the significant harmonics above the $5^{th}$, namely, the $7^{th}$ and $11^{th}$, are handled entirely by the sub-modules 14, there is no need for synchronous filters for the $7^{th}$ and $11^{th}$ harmonics as part of the harmonic compensation control for the main module 12. The harmonic control signals for the $5^{th}$ harmonic on lines 62, 64 and 66 drive a three channel PWM 70 to generate a PWM drive signal that controls the switching transistors 20 in the main module 12 for the three phases in the NWS 10 as described above in connection with FIG. 1 to attenuate the most predominant harmonic, in this case, the $5^{th}$.

Alternatively, the synchronous filter 50 for the harmonic compensation control of the main module 12 may of the two-phase type if three-phase to two-phase transformations are used on the inputs and two-phase to three phase transformations are used on the outputs. In this case, the PLL 38 generates quadrature signals for the $5^{th}$ harmonic.

The switching strategy may employ a variable switching frequency to minimise size of the input filter. Another objective of this disclosure is to reduce size of the interface transformer 28 in each single-phase sub-module 14. This is accomplished by cancelling current on the fundamental frequency in a way similar to the harmonic cancellation described above. This control allows use of a planar design for the transformer 28. In this case, the DC bus of the sub-modules 14 connects with the DC bus of the main module 12. In addition, the DC bus potential may be controlled in response to the harmonic of interest, to optimise harmonic distortions, for example, six-pulse operation at higher compensation frequency.

Described above is an active filtration or harmonic scrubber system for power systems that convert AC power on an AC bus to DC power that cancels or reduces harmonic current injected by nonlinear loads onto the AC bus using high-bandwidth pulse width modulation (PWM) inverters. It should be understood that this embodiment is only an illustrative implementation of the invention, that the various parts and arrangement thereof may be changed or substituted, and that the invention is only limited by the scope of the attached claims.

What is claimed is:

1. For a power conversion system that converts alternating current (AC) power on an AC bus to DC power, a harmonic scrubber that reduces ripple currents for selected harmonics on the AC bus due to nonlinear loads on the AC bus, comprising:
   at least one phase-locked loop (PLL) coupled to each phase of the AC bus for producing synchronisation signals for each of the selected harmonics on each phase of the AC bus;
   at least one synchronous filter coupled to each PLL for each of the selected harmonics for combining corresponding harmonic synchronisation signals with ripple signals that represent the potentials of the ripple currents to produce harmonic compensation control signals for each of the selected harmonics that are equal in amplitude and opposite in phase to the potentials of the ripple currents on each phase of the AC bus;
   at least one pulse width modulator (PWM) for generating PWM drive signals for each phase of the AC bus in response to the harmonic compensation control signals; and
   at least one active filter coupled to each phase of the AC bus responsive to the PWM drive signals to reduce the harmonic ripple currents on each phase of the AC bus.

2. The harmonic scrubber of claim 1, wherein at least one PLL generates synchronisation signals for each phase of the AC bus.

3. The harmonic scrubber of claim 1, wherein the synchronous filters combine the ripple signals with corresponding synchronisation signals for each phase of the AC bus.

4. The harmonic scrubber of claim 1, wherein a different PLL generates quadrature synchronisation signals for each phase of the AC bus at each selected harmonic.

5. The harmonic scrubber of claim 1, wherein at least one PLL generates synchronisation signals for all phases of the AC bus for at least one selected harmonic.

6. The harmonic scrubber of claim 1, wherein at least one active filter responds to at least one selected harmonic of a lower frequency and other active filters respond to selected harmonics of higher frequencies.

7. The harmonic scrubber of claim 1, wherein different active filters respond to different phases of the AC bus for the selected harmonics.

8. The harmonic scrubber of claim 1, wherein each active filter is controlled by a separate PWM.

9. The harmonic scrubber of claim 1, wherein one active filter driven by one PWM and controlled by one PLL filters at least one selected harmonic of a lower frequency for all the phases of the AC bus and different active filters each driven by a separate PWM controlled by an associated PLL filter the selected harmonics for each phase of the AC bus.

10. For a polyphase power conversion system that converts alternating current (AC) power on an AC bus to DC power, a harmonic scrubber that reduces harmonic ripple currents for selected harmonics on the AC bus due to nonlinear loads on the AC bus, comprising:
    a polyphase phase-locked loop (PLL) coupled to each phase of the AC bus for producing synchronisation signals for each of the phases of the AC bus for a selected lowest frequency harmonic;
    at least one a single-phase PLL, with each single-phase PLL coupled to a different phase of the AC bus for producing synchronisation signals for the selected harmonics on each phase of the AC bus;
    a polyphase synchronous filter coupled to the polyphase PLL for the selected lowest frequency harmonic for combining the corresponding harmonic synchronisation signals from the polyphase PLL with ripple signals that represent the potentials of the ripple currents for each of the phases of the AC bus to produce polyphase harmonic compensation control signals for the selected lowest frequency harmonic that are equal in amplitude and opposite in phase to the potentials of the ripple currents on each phase of the AC bus;
    at least one single-phase synchronous filter coupled to each single-phase PLL for each of the selected harmonics for combining corresponding harmonic synchronisation signals from each single-phase PLL with ripple signals that represent the potentials of the ripple currents for each of the phases of the AC bus to produce harmonic compensation control signals for each of the selected harmonics that are equal in amplitude and opposite in phase to the potentials of the ripple currents on each phase of the AC bus;
    a polyphase pulse width modulator (PWM) for generating polyphase PWM drive signals in response to the harmonic compensation control signals from the polyphase synchronous filter;
    a single-phase PWM for each phase of the AC bus for generating single-phase PWM drive signals in response to the harmonic compensation control signals from each of the single-phase synchronous filters;
    a polyphase active filter coupled to each phase of the AC bus responsive to the polyphase PWM drive signals from the polyphase PWM to reduce the harmonic ripple currents at the selected lowest frequency harmonic on all phases of the AC bus; and
    at least one single-phase active filter coupled to each phase of the AC bus responsive to the single-phase PWM drive signals to reduce the harmonic ripple currents for the selected harmonics on all phases of the AC bus.

11. The harmonic scrubber of claim 10, wherein the power conversion system is three-phase.

12. The harmonic scrubber of claim 10, wherein the single-phase PLLs generate quadrature synchronisation signals.

13. The harmonic scrubber of claim 10, wherein the polyphase PLL generates a synchronisation signal for each phase of the AC bus.

14. The harmonic scrubber of claim 10, further comprising a polyphase to two-phase transformation for an input of the polyphase synchronous filter, a two-phase to three phase transformation for an output of the polyphase synchronous filter, and
    wherein the polyphase PLL generates quadrature synchronisation signals instead of a synchronisation signal for each phase of the AC bus.

15. For a three-phase power conversion system that converts alternating current (AC) power on an AC bus to DC power, a harmonic scrubber that reduces harmonic ripple currents for selected harmonics on the AC bus due to nonlinear loads on the AC bus, comprising:

- a three-phase phase-locked loop (PLL) coupled to each of the three phases of the AC bus for producing synchronisation signals for each of the phases of the AC bus for the selected lowest frequency harmonic;
- three single-phase PLLS, with each PLL coupled to a different phase of the AC bus for producing synchronisation signals for the selected harmonics on each phase of the AC bus;
- a three-phase synchronous filter coupled to the three-Phase PLL for the selected lowest frequency harmonic for combining the corresponding harmonic synchronisation signals from the three-phase PLL with ripple signals that represent the potentials of the ripple currents for each of the phases of the AC bus to produce three-phase harmonic compensation control signals for the selected lowest frequency harmonic that are equal in amplitude and opposite in phase to the potentials of the ripple currents on each phase of the AC bus;
- at least one single-phase synchronous filter coupled to each single-phase PLL for each of the selected harmonics for combining corresponding harmonic synchronisation signals from each single-phase PLL with ripple signals that represent the potentials of the ripple currents for each of the phases of the AC bus to produce harmonic compensation control signals for each of the selected harmonics that are equal in amplitude and opposite in phase to the potentials of the ripple currents on each phase of the AC bus;
- a three-phase pulse width modulator (PWM) for generating three-phase PWM drive signals in response to the harmonic compensation control signals from the three-phase synchronous filter;
- three single-phase PWMs, with each single-phase PWM generating a single-phase PWM drive signal for a different phase of the AC bus in response to the harmonic compensation control signals from each of the single-phase synchronous filters;
- a three-phase active filter coupled to each phase of the AC bus responsive to the three-phase PWM drive signals from the three-phase PWM to reduce the harmonic ripple currents at the selected lowest frequency harmonic on all phases of the AC bus; and
- three single-phase active filters, with each single-phase active filter coupled to a different phase of the AC bus responsive to the single-phase PWM drive signals to reduce the harmonic ripple currents for the selected harmonics on all phases of the AC bus.

16. The harmonic scrubber of claim 15, wherein the single-phase PLLs generate quadrature synchronisation signals.

17. The harmonic scrubber of claim 15, wherein the three-phase PLL generates a synchronisation signal for each phase of the AC bus.

18. The harmonic scrubber of claim 15, further comprising a three-phase to two-phase transformation for an input of the polyphase synchronous filter, a two-phase to three phase transformation for an output of the polyphase synchronous filter, and wherein the polyphase PLL generates quadrature synchronisation signals instead of a synchronisation signal for each phase of the AC bus.

* * * * *